(12) United States Patent  
Dahlseid et al.

(10) Patent No.: US 7,283,178 B2
(45) Date of Patent: Oct. 16, 2007

(54) SYSTEM AND METHOD FOR MULTIMODE INFORMATION HANDLING SYSTEM TV OUT CABLE CONNECTION

(75) Inventors: Ronald Dahlseid, Round Rock, TX (US); Randall E. Juneger, Belton, TX (US)

(73) Assignee: Dell Products L.P., Round Rock, TX (US)

( * ) Notice: Subject to any disclaimer, the term of this patent is extended or adjusted under 35 U.S.C. 154(b) by 682 days.

(21) Appl. No.: 10/916,315

(22) Filed: Aug. 11, 2004

(65) Prior Publication Data

US 2006/0033842 A1 Feb. 16, 2006

(51) Int. Cl.
*H04N 5/44* (2006.01)
*H04N 7/00* (2006.01)

(52) U.S. Cl. .............................. 348/553; 348/552
(58) Field of Classification Search ............... 348/552, 348/553; 725/133, 131, 139, 141, 151, 153; H04N 5/44, H04N 7/00
See application file for complete search history.

(56) References Cited

U.S. PATENT DOCUMENTS 5,828,349 A    10/1998  MacHesney et al. ........... 345/3
5,929,924 A    7/1999   Chen ........................... 348/552
6,359,575 B1   3/2002   Knudsen ...................... 341/118
6,559,859 B1   5/2003   Henry et al. ................. 345/690
6,697,033 B1   2/2004   Leung et al. .................. 345/5
6,753,881 B1   6/2004   Callway et al. ............. 345/699
7,116,376 B2 * 10/2006  Yun ............................ 348/552

\* cited by examiner

*Primary Examiner*—Sherrie Hsia
(74) *Attorney, Agent, or Firm*—Hamilton & Terrile, LLP; Robert W. Holland

(57) ABSTRACT

An information handling system outputs plural types of TV out signal formats from a common TV out port by configuring graphics card digital-to-analog converters to generate a selected TV out signal and communicating the TV out signal through an appropriate adapter cable. For instance, graphics card VGA digital-to-analog converters are selectively configured to output component video with three converters, super video with two converters or composite video with one converter. The TV out signal is outputted at a super video port with component and composite video communicated through an adapter cable having a super video connector at one end and a component video connector at another end. Automated selection of the TV out signal format is performed by detecting the number of active TV out signals, three for component video, two for super video and one for composite video.

20 Claims, 3 Drawing Sheets

SYSTEM AND METHOD FOR MULTIMODE INFORMATION HANDLING SYSTEM TV OUT CABLE CONNECTION

BACKGROUND OF THE INVENTION

1. Field of the Invention

The present invention relates in general to the field of information handling system cable connections, and more particularly to a system and method for a multimode TV Out connection from an information handling system for display of Component Out signals by a television.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have become increasingly popular tools to present multimedia information. As processor speeds and memory storage capacity have increased, information handling systems have even found a niche as entertainment centers to store and then play audio and video files, such as music stored in the MP3 format and movies compressed as DVDs in the MPEG II standard. Portable information handling systems are particularly popular for playing multimedia information. For instance, businessmen who travel often rely on portable information handling systems for performing business functions, such as display of presentations at business meetings, and for entertainment during the down time invariably associated with travel, such as playing music or watching a DVD movie on the portable information handling system integrated display. In order to further enhance the entertainment functionality of information handling systems, manufacturers have incorporated TV Out capability that outputs a television signal from the information handling system in a format that plays on a television.

One difficulty that arises with the communication of information from an information handling system to a television is that the quality of the video and audio is often degraded in the conversion from digital formats used to save the information and analog formats used by televisions. For example, composite video used by conventional televisions displays video information at relatively low resolution with a single signal that combines luminance, color and synchronization information. Super video is more commonly found in portable information handling systems and typically outputs better quality video than composite video with two separate signals. High definition television signals, known as component video, provide the highest currently available standardized television picture. Component video sends video information in three separate signals, a Y signal with luminance information, a Pr signal with color information and a Pb signal with synchronization information. Typically portable information handling systems output a single type of video signal, such as super video, and use adaptive connectors that convert the output signal to other types of signals, such as composite video. For example, one conventional connector connects to a VGA port of an information handling system and converts the RGB signals to a desired output, such as component video. However, the quality of the component signal is degraded since the process of output the component signal involves multiple conversions of the video information between digital and analog formats. For instance, the VGA graphics card converts digital video information to analog RGB signals, the connector converts the analog RGB signals to digital information and then reconverts the digital information to analog component signals.

SUMMARY OF THE INVENTION

Therefore a need has arisen for a system and method which outputs a selected of plural TV out signal formats from a common information handling system TV out port.

In accordance with the present invention, a system and method are provided which substantially reduce the disadvantages and problems associated with previous methods and systems for outputting TV out signals from an information handling system. Digital-to-analog converters are configured to generate a selected of plural TV out signals for output at an information handling system TV out port. TV out signals that differ from the TV out port signal format are adapted through a cable having a connector to couple with the TV out port at one end and connector with the outputted signal format at the other end.

More specifically, a graphics controller selectively drives digital-to-analog converters to generate a desired TV out signal format for output at an information handling system TV out port. Three converters are used to drive component video, two converters are used to drive super video and a single converter is used to drive composite video. The TV out signals are sent to a common port having a connector associated with one of the TV out signal formats, such as a super video connector. TV's having the connector's signal format couple directly to the connector while TV's having another signal format couple through an adapter cable having one end with a connector that couples to the information handling system and an opposing end that couples to the TV. A TV out controller detects the desired TV out signal format by determining the number of active signals placing a load on the connector and communicates the TV out signal format to the graphics controller for automatic configuration of the digital-to-analog converters. Three active signals indicate a component video TV connection, two active signals indicate a super video TV connection, and one active signal indicates a composite video connection.

The present invention provides a number of important technical advantages. One example of an important technical advantage is that plural TV out signal formats are output from a single information handling system TV out port. In order to simplify user interaction, selection of the appropriate TV out signal format is automatically performed based on the number of signal loads. The adapter cable provides an intuitive interface between the information handling system and a television that user couples to existing connectors.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system outputs plural TV out signals from a common connector by using varied configurations of digital-to-analog converters and an adapter cable that adapts signals from the common connector format to a selected format. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
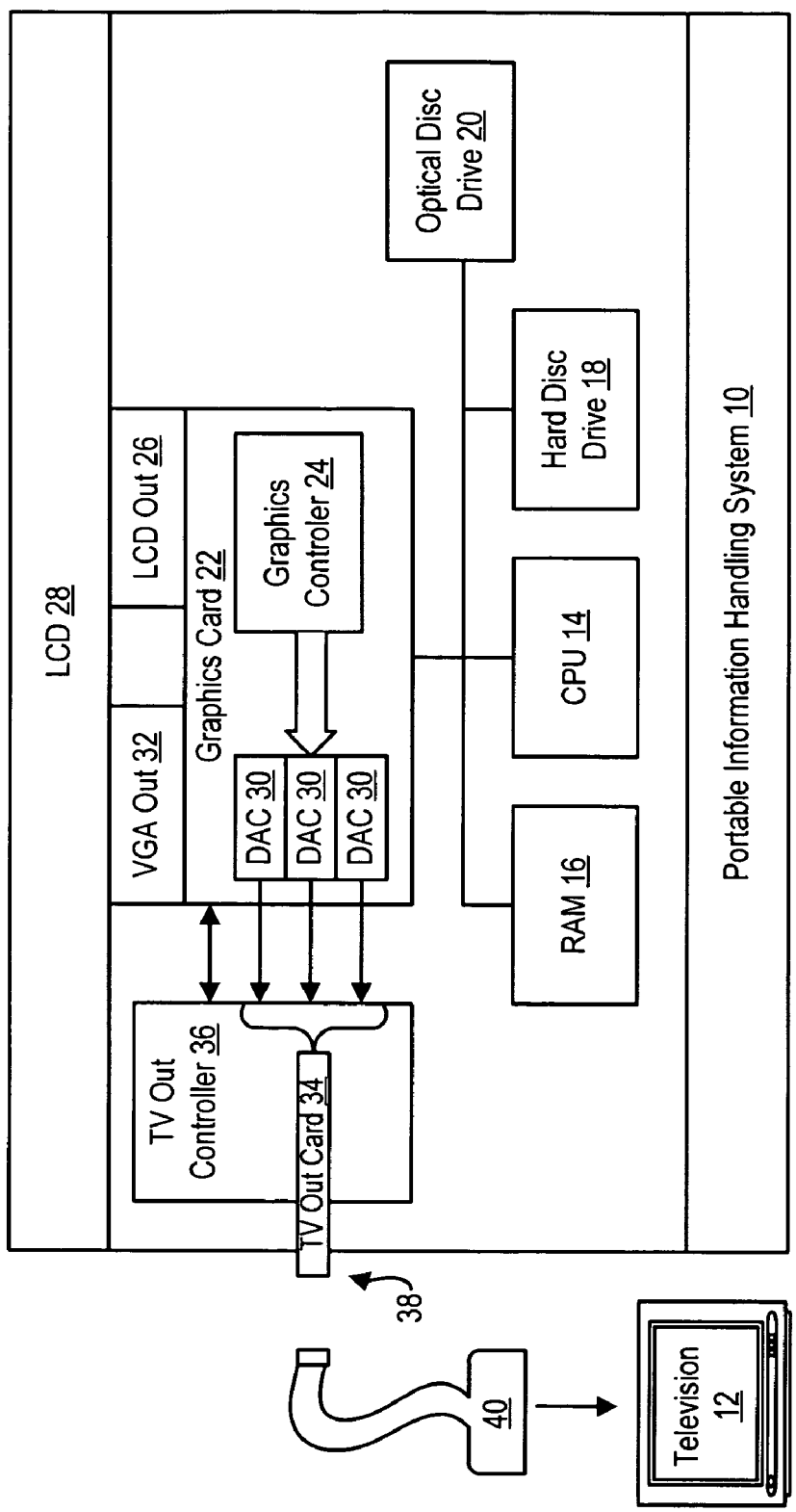
FIG. 1 depicts a block diagram of a portable information handling system operable to select from plural TV out signals.

Referring now to FIG. 1, a block diagram depicts a portable information handling system 10 operable to select from plural TV out signals for communication of audiovisual information to a television 12. A CPU 14 cooperates with RAM 16 to run multimedia applications that generate display information, such as by playing movies stored in hard disc drive 18 or read from optical disc drive 20. The display information is communicated to a graphics card 22 for processing with graphics controller 24 and sent through LCD out port 26 for display at LCD 28. In addition, graphics controller 24 drives three digital-to-analog converters 30 to generate VGA formatted display signals at a VGA port 32. The VGA signals are output as three active signals with red, green and blue color based on the digital display information provided to graphics controller 24.

Graphics card 22 also interfaces with a TV out card 34 to communicate display information to TV 12 in a selected of plural TV out formats, such as component video, super video or composite video, through a TV out port 38. Graphics card 22 drives a selected TV out format by re-configuring digital-to-analog converters 30 from outputting VGA signals to output TV out signals. A TV out controller 36 monitors a TV out port 38 to determine the type of TV out signal format used by television 12 and communicates the selected TV out signal format to graphics controller 24. For instance, if three active signals are detected, graphics controller 24 configures digital-to-analog converters 30 to output component video; if two active signals are detected graphics controller 24 configures digital-to-analog converters 30 to output super video; and if a single active signal is detected graphics controller 24 configures digital-to-analog converters 30 to output composite video. Alternatively, an application interface with graphics controller 24 allows user-initiated selection of a desired TV out signal format. TV out port 38 has the physical connection format associated with one of the TV out signals, such as a super video port, so that a television 12 having the same physical connection may communicate over an appropriate cable. Other TV out signal formats are adapted for communication to television 12 through an adapter cable 40.

Figure 2:
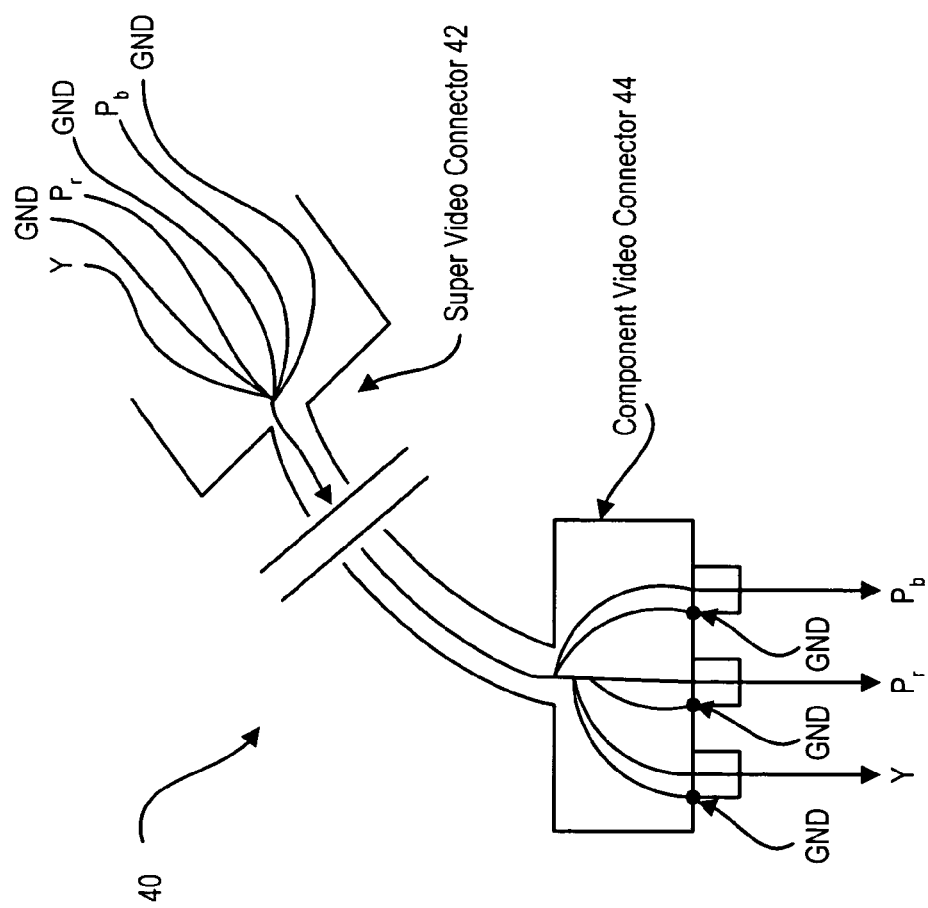
FIG. 2 depicts an adapter cable to adapt a component video signal output from a super video connector.

Referring now to FIG. 2, an adapter cable is depicted that adapts a component video signal output from an information handling system through a super video connector. Cable 40 has a super video connector 42 at one end and a component video connector 44 at an opposing end. Super video connector 42 includes at least six wires compliant with super video standards and component video connector 44 also has at least six wires compliant with component video standards. Cable 40 routes the wires from super video connector 42 to component video connector 44 so that Y, Pr and Pb signals input at super video connector 42 are communicated to the appropriate component video jack. Composite video is sent through adapter cable 40 through one of the component video jacks labeled appropriately.

Figure 3:
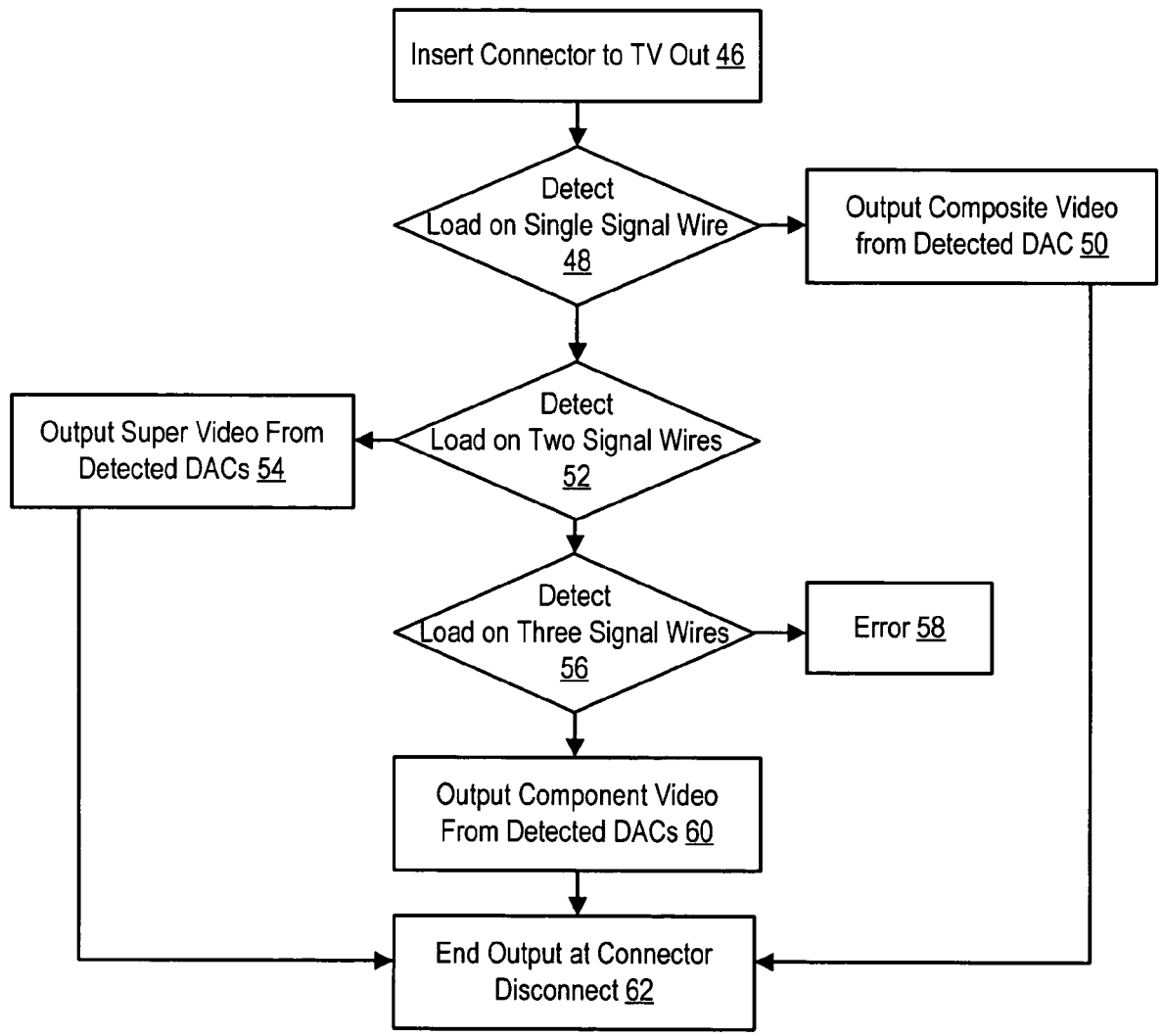
FIG. 3 depicts a method for outputting a selected of plural TV out signal formats.

Referring now to FIG. 3, a method for outputting a selected of plural TV out signal formats is depicted. The process begins at step 46 with insertion of a connector to the TV out port of an information handling system. At step 48, if a load is detected on a single active signal wire, the process continues to step 50 for configuration of a single digital-to-analog converter to output a composite video signal. If not, the process continues to step 52 to determine whether a load is detected on two active signal wires and, if so, the process continues to step 54 for configuration of the digital-to-analog converters to output a super video signal. If not, the process continues to step 56 to determine whether a load is detected on three active signal wires. Failure to detect active signal wires with an inserted connector results in an error at step 58 with an appropriate warning to the user. Detection of three active signal wires at step 56 results in configuration of the digital-to-analog converters to output component video at step 60. The output of the TV out signal ends at step 62 with disconnection of the connector from the information handling system TV out port.

Although the present invention has been described in detail, it should be understood that various changes, substitutions and alterations can be made hereto without departing from the spirit and scope of the invention as defined by the appended claims.

What is claimed is:

1. An information handling system comprising:
   a central processing unit operable to generate display information in a digital format;
   a graphics card interfaced with the central processing unit, the graphics card having plural digital-to-analog converters and operable to accept the display information from the central processing unit, to convert the display information to an analog format with one or more of the digital-to-analog converters and to communicate the display information in the analog format to at least one display port for presentation at a display;
a TV out card interfaced with the digital-to-analog converters, the TV out card having a connector associated with each interfaced digital-to-analog converter; and
a graphics controller associated with the graphics card, the graphics controller operable to selectively activate plural sets of one or more of the digital-to-analog converters, each set associated with a television format.

2. The information handling system of claim 1 further comprising:
an integrated liquid crystal display interfaced with the graphics card and operable to present the display information; and
a VGA port interfaced with the graphics card and the plural digital-to-analog converters, the graphics controller operable to select either a VGA output or a television format output from the digital-to-analog converters.

3. The information handling system of claim 1 further comprising:
a TV out controller interfaced with the graphics controller, the TV out controller operable to detect the number of TV out connectors coupled to the TV out card, to associate the detected number with a television format, and to communicate the television format to the graphics controller for configure the digital-to-analog converters.

4. The information handling system of claim 1 wherein the television formats comprise component video having three activated digital-to-analog converters.

5. The information handling system of claim 4 wherein the television formats further comprise super video having two activated digital-to-analog converters.

6. The information handling system of claim 5 wherein the TV out card connectors comprise a super video connector, the information handling system further comprising an adapter cable having a first end with a super video connector operable to couple with the TV out connectors and a second end with a component video connector operable to couple with a component video television.

7. The information handling system of claim 6 further comprising digital audio connectors integrated with the adapter cable.

8. The information handling system of claim 5 wherein the television formats further comprise composite video have a single activated digital-to-analog converter.

9. A method for outputting plural TV out signal formats from a common information handling system port, the method comprising:
selecting a desired of the plural TV out signal formats;
associating a predetermined number of digital-to-analog converters with the selected TV out signal format;
configuring the predetermined digital-to-analog converters to output the selected TV out signal; and
driving the TV out signal to the port from the digital-to-analog converters in the selected format.

10. The method of claim 9 wherein:
selecting a desired of the plural TV out signals further comprises selecting component video;
associating a predetermined number of digital-to-analog converters further comprises associating three digital-to-analog converters; and
driving the TV out signal further comprises driving the component video signal to a super video connector coupled to the port, through a cable and terminating at a component video connector.

11. The method of claim 10 wherein configuring the predetermined digital-to-analog converters further comprises configuring graphics card VGA digital-to-analog converters to output component video.

12. The method of claim 9 wherein:
selecting a desired of the plural TV out signals further comprises selecting super video;
associating a predetermined number of digital-to-analog converters further comprises associating two digital-to-analog converters; and
driving the TV out signal further comprises driving the super video signal to a component video connector coupled to the port, through a cable and terminating at a super video connector.

13. The method of claim 12 wherein configuring the predetermined digital-to-analog converters further comprises configuring graphics card VGA digital-to-analog converters to output super video.

14. The method of claim 12 wherein configuring the predetermined digital-to-analog converters further comprises configuring a graphics card VGA digital-to-analog converter to output composite video.

15. The method of claim 9 wherein:
selecting a desired of the plural TV out signals further comprises selecting composite video;
associating a predetermined number of digital-to-analog converters further comprises associating one digital-to-analog converters; and
driving the TV out signal further comprises driving the composite video signal to a component video connector coupled to the port, through a cable and terminating at a composite video connector.

16. A method for outputting signals from an information handling system, the signals having a selected of plural TV out formats, the method comprising:
configuring a set of digital-to-analog converters to output a first TV out format to a port associated with the first TV out format;
re-configuring the set of digital-to-analog converters to output a second TV out format to the port associated with the first TV out format;
coupling a cable to the port associated with the first TV out format, the cable having a first end connector associated with the first TV out format and a second end connector associated with the second TV out format; and
sending signals formatted with the second TV out format through the cable for output at the second end connector.

17. The method of claim 16 wherein the first TV out format is super video and the second TV out format is component video.

18. The method of claim 16 wherein the first TV out format is component video and the second TV out format is super video.

19. The method of claim 16 further comprising:
coupling a TV with the one of the port or the second end connector;
detecting whether the TV is associated with the first or second TV out format; and
automatically configuring the digital-to-analog converters to output the detected TV out format.

20. The method of claim 16 further comprising:
re-configuring the digital-to-analog converters to output VGA formatted signals to a VGA connector.

* * * * *